(12) United States Patent
Boland et al.

(10) Patent No.: US 9,952,315 B2
(45) Date of Patent: Apr. 24, 2018

(54) OPTICAL PULSE CONTRAST IMPROVEMENT USING NONLINEAR CONVERSION

(71) Applicant: Raytheon Company, Waltham, MA (US)

(72) Inventors: Brian F. Boland, Redondo Beach, CA (US); Robert D. Stultz, Cypress, CA (US); John J. Wootan, Hermosa Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 451 days.

(21) Appl. No.: 14/298,573

(22) Filed: Jun. 6, 2014

(65) Prior Publication Data

US 2015/0355316 A1    Dec. 10, 2015

(51) Int. Cl.
| | |
|---|---|
| G01C 3/08 | (2006.01) |
| G01S 7/48 | (2006.01) |
| G01S 17/10 | (2006.01) |
| G01S 7/481 | (2006.01) |
| G01S 7/484 | (2006.01) |

(52) U.S. Cl.
CPC ............ G01S 7/4802 (2013.01); G01S 7/484 (2013.01); G01S 7/4814 (2013.01); G01S 17/10 (2013.01)

(58) Field of Classification Search
CPC ........ G01S 17/352; G01S 7/491; G01S 17/58; G01S 17/102; G01S 17/36
USPC ..... 356/3.01, 3.09, 4.01, 4.07, 5.01, 5.09, 9, 356/625
See application file for complete search history.

(56) References Cited

U.S. PATENT DOCUMENTS

| | | |
|---|---|---|
| 7,430,351 B2 | 9/2008 | Albert et al. |
| 7,583,364 B1 | 9/2009 | Mayor et al. |
| 7,876,803 B1 | 1/2011 | Di Teodoro et al. |
| 2004/0021852 A1* | 2/2004 | DeFlumere ................ 356/141.1 |
| 2007/0024840 A1* | 2/2007 | Fetzer et al. ................ 356/4.01 |
| 2007/0104431 A1 | 5/2007 | Di Teodoro et al. |
| 2009/0010288 A1* | 1/2009 | Keaton et al. .................. 372/25 |
| 2014/0050234 A1* | 2/2014 | Ter-Mikirtychev .............. 372/6 |

OTHER PUBLICATIONS

P.V. Mamyshev, "All-Optical Data Regeneration Based on Self-Phase Modulation Effect", Sep. 20-24, 1998, p. 475-476.
Govind P. Agrawal, "All-Optical Signal Processing and Optical Regeneration", Institute of Optics, University of Rochester, 2007, 36 pages.
Notification of Transmittal of the International Search Report and the Written Opinion of the International Searching Authority, or the Declaration dated Nov. 24, 2015 in connection with International Patent Application No. PCT/US2015/024041.

* cited by examiner

*Primary Examiner* — Samantha K Abraham

(57) ABSTRACT

A laser radar (LADAR) system includes a laser transmitter configured to emit laser pulses at a first wavelength, a non-linear converter configured to convert the laser pulses to a second wavelength prior to spectral filtering of amplified spontaneous emission (ASE) that is emitted from the laser transmitter in a spectrum concentrated around the first wavelength, and a spectral filter configured to substantially filter the ASE and allow the laser pulses at the second wavelength to pass.

20 Claims, 4 Drawing Sheets

OPTICAL PULSE CONTRAST IMPROVEMENT USING NONLINEAR CONVERSION

TECHNICAL FIELD

The present disclosure is directed in general to LADAR systems and more specifically to the use of nonlinear conversion techniques to improve optical pulse contrast in LADAR systems.

BACKGROUND OF THE DISCLOSURE

A LADAR (Laser Detection and Ranging) system is a laser-based radar system that has many applications, including those in the defense industry. Like conventional radar systems, LADAR systems transmit, receive, and detect electromagnetic waves that reflect from a target. Instead of operating in millimeter and microwave wavelengths, like conventional radar, LADAR systems operate at laser wavelengths, such as in the micrometer and sub-micrometer bands.

SUMMARY OF THE DISCLOSURE

To address one or more deficiencies of the prior art, one embodiment described in this disclosure provides a laser radar (LADAR) system. The LADAR system includes a laser transmitter configured to emit laser pulses at a first wavelength, a non-linear converter configured to convert the laser pulses to a second wavelength prior to spectral filtering of amplified spontaneous emission (ASE) that is emitted from the laser transmitter in a spectrum concentrated around the first wavelength, and a spectral filter configured to substantially filter the ASE and allow the laser pulses at the second wavelength to pass.

Another embodiment in this disclosure provides a method for use in a LADAR system. The method includes emitting, at a laser transmitter, laser pulses at a first wavelength and ASE in a spectrum concentrated around the first wavelength; converting, at a non-linear converter, the laser pulses to a second wavelength prior to spectral filtering of the ASE; and substantially filtering, at a spectral filter, the ASE and allowing the laser pulses at the second wavelength to pass.

A further embodiment in this disclosure provides a Geiger mode LADAR system. The Geiger mode LADAR system includes a Geiger mode laser transmitter configured to emit laser pulses at a first wavelength, a non-linear converter configured to convert the laser pulses to a second wavelength prior to spectral filtering of ASE that is emitted from the laser transmitter in a spectrum concentrated around the first wavelength, and a spectral filter disposed in a transmit path of the Geiger mode LADAR system, where the spectral filter is configured to substantially filter the ASE and allow the laser pulses at the second wavelength to pass.

Although specific advantages have been enumerated below, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
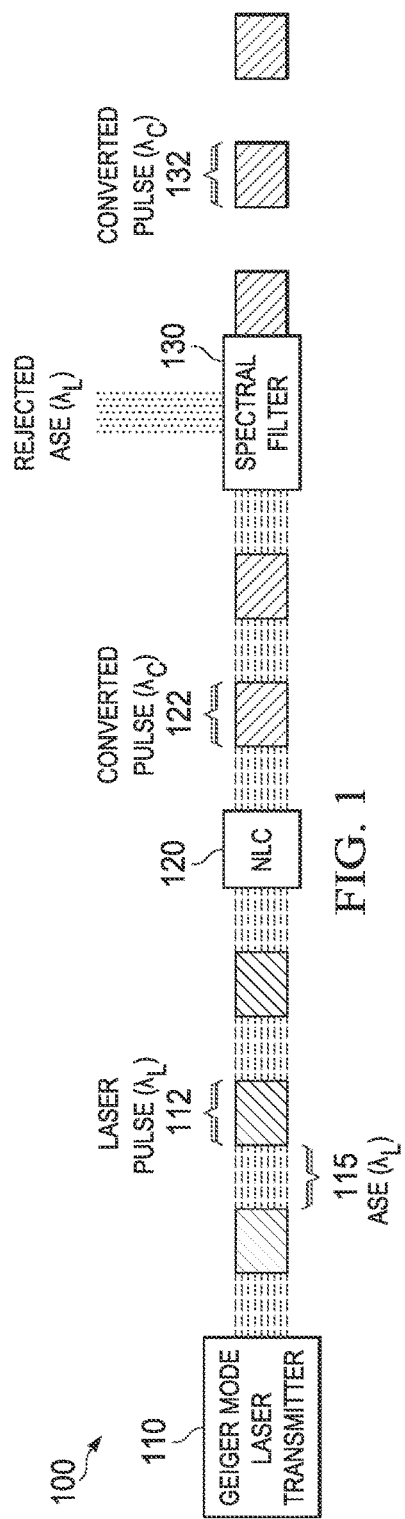
FIG. 1 illustrates an example portion of a Geiger mode LADAR system, according to this disclosure.

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

A Geiger mode avalanche photodiode (GMAPD) LADAR system is a type of LADAR system that is used for 3D imaging of objects at long range by precisely measuring a time of flight for short duration laser pulses. GMAPDs are single photon sensitive, with a dead time following each detection event. Amplified spontaneous emission (ASE) from pulsed laser transmitters can be problematic in GMAPD detection systems, because the ASE is a continuous source of photons that can blind the detector, preventing the detection of a return pulse, especially in shared aperture LADAR systems. The ASE can be filtered, for example, by angle, wavelength, and polarization. However, in-band and in-beam ASE may be difficult to filter, and can reach the detection system before the laser pulse arrives. This is problematic due to the dead time associated with GMAPD detectors after a detection event. The ASE photons that arrive before the return laser pulse can blind the detector and cause a false time of flight measurement.

To address these issues, embodiments of this disclosure eliminate the in-band and in-beam components of the ASE by using nonlinear optical frequency conversion to shift the wavelength of the transmitted laser pulse. Because the conversion efficiency of the nonlinear process is intensity dependent, the short duration laser pulse will convert efficiently, while the low intensity ASE will be unaffected. The wavelength shifted pulse may then be spectrally filtered from the ASE.

The embodiments disclosed herein provide an intensity-dependent wavelength shift to allow separation of laser pulses from ASE through spectral filtering. The use of the intensity-dependent wavelength shift at the transmit end of a Geiger mode LADAR system combined with a spectral filter at the receive end serves to block ASE from reaching the Geiger mode detector. In some embodiments, the intensity-dependent wavelength shift induced at the transmit end is used to spectrally distinguish between returns intended for coherent or Geiger mode detectors at the receive end of the LADAR system. Also, because wavelengths that are advantageous for atmospheric transmission do not always coincide with preferred operating wavelengths of laser transmitters, the disclosed embodiments provide an added benefit by allowing the laser transmitter wavelength to be shifted to a better atmospheric window.

It will be understood that embodiments of this disclosure may include any one, more than one, or all of the features described herein. In addition, embodiments of this disclosure may additionally or alternatively include other features not listed herein.

FIG. 1 illustrates example components of a transmit path of a Geiger mode LADAR system, according to this disclosure. The embodiment of the LADAR transmit path 100 illustrated in FIG. 1 is for illustration only. The transmit path components 100 illustrated in FIG. 1 may represent only a portion of a complete Geiger mode LADAR system which may also include a receiver (sensor) path (not shown in FIG. 1). Other embodiments could be used without departing from the scope of this disclosure.

In a LADAR system that utilizes a transmit path such as the LADAR transmit path 100, short laser pulses are generated by a laser transmitter. The laser pulses are transmitted over a distance, hit a target, and then echo back, where they are received by a receiver of the LADAR system, such as a Geiger mode receiver. A Geiger mode receiver is a photon counter and is sensitive to background light at the single photon level, including the ASE generated by the LADAR transmitter itself.

The ASE is low power, especially compared to the laser pulse (e.g., ASE may have a power on the order of 0.1 milliwatts, which is low compared to an outgoing laser pulse that may have a peak power on the order of 10 megawatts). A laser signal pulse returning from a target echo is of low intensity and may be at a level comparable to or below that of the ASE, which is typically emitted from the laser transmitter even during times when there is no outgoing laser pulse. The ASE emitted by the laser can reach the Geiger-mode sensor through reflection or scattering within the LADAR system. This reflected or scattered ASE can blind the sensor, thereby preventing the detection of a return pulse.

To resolve this issue, the output of the laser transmitter is passed through a non-linear conversion device, which shifts the wavelength of the laser pulse out of the spectral band of the ASE. This allows a spectral filter to block the ASE but permit the wavelength-shifted laser pulse to pass through to the receiver.

As shown in FIG. 1, the LADAR transmit path 100 includes a Geiger mode laser transmitter 110, a non-linear converter (NLC) 120, and a spectral filter 130. The LADAR transmit path 100 may include other components; however, descriptions of such components are not necessary and are omitted herein for clarity. As used herein, a Geiger mode laser transmitter refers to a laser transmitter that emits optical pulses and is used in conjunction with a Geiger mode sensor in a LADAR system.

The laser transmitter 110 may comprise any one of a number of suitable lasers or laser amplifiers. For example, the laser transmitter 110 may include a Nd:YAG (Neodymium-doped yttrium aluminum garnet (YAG)) amplifier, a Yb:YAG (Ytterbium-doped YAG) amplifier, a Ho:YAG (Holmium-doped YAG) amplifier, an Er:YAG (Erbium YAG) amplifier, an Er:glass amplifier, a Tm:YAG (Thulium-doped YAG) amplifier, variations of these amplifiers which are co-doped with a sensitizer ion (e.g., Er,Yb:glass), or any other suitable laser source or amplifier. The laser transmitter 110 emits short laser pulses 112 at a wavelength $\lambda_L$. The wavelength $\lambda_L$ is dependent on the type of laser used in the transmitter 110. The laser transmitter 110 also emits ASE 115 in a spectrum surrounding the same wavelength $\lambda_L$ as the laser pulses 112.

The NLC 120 is a non-linear converter, also referred to as a non-linear wavelength shifter. The NLC 120 may be comprised of a crystalline material. In some embodiments, the NLC 120 is an optical parametric amplifier (OPA), as described in greater detail below. The NLC receives the laser pulses 112 and the ASE 115 emitted from the laser transmitter 110. The NLC 120 converts (or shifts) the laser pulses 112 at wavelength $\lambda_L$ to pulses 122 at a different wavelength $\lambda_C$. The conversion efficiency of the NLC 120 is dependent on the intensity of the input signal, as well as a phase matching condition. Thus, the high intensity laser pulses 112 are subject to the wavelength shift, but the low intensity, in-band, in-beam ASE 115 is substantially unaffected, as described in greater detail below. Accordingly, the NLC 120 does not convert the wavelength of the ASE 115.

The wavelength shift is configurable and may be selected based on the bandwidth of the ASE 115 from the laser transmitter 110. That is, in order to adequately filter out the ASE 115, the wavelength shift produced by the NLC 120 should be to a wavelength $\lambda_C$ that is outside all (or substantially all) of the bandwidth of the ASE 115. This ASE bandwidth varies with the type of laser transmitter used. For example, the bandwidth of the ASE 115 could range from nanometers for one micron emission from Nd:YAG and Yb:YAG materials, to tens of nanometers for two micron emission from Ho:YAG material. Ideally, the shifting of the laser pulse wavelength is to a spectral region that is devoid of laser ASE.

The spectral filter 130 serves to separate the converted laser pulses 122 at the wavelength $\lambda_C$ from the ASE 115 concentrated around the wavelength $\lambda_L$. In some embodiments, the spectral filter 130 is located in the receiver (sensor) path of the LADAR system. That is, the spectral filter 130 directs signals that have already been transmitted to the target object and have echoed back to the LADAR system to the Geiger mode sensor (detector). The spectral filter 130 directs the converted laser pulses 122 at the wavelength $\lambda_C$ to the Geiger mode sensor and filters out all, or a substantial portion, of the ASE 115 around the wavelength $\lambda_L$, thereby leaving only the converted laser pulses 132 at the wavelength $\lambda_C$ to be sensed (detected) by the Geiger mode receiver of the LADAR system. Typically, ASE photons in the receiver path are those that are scattered from optics or components which are common to the transmit and receiver paths.

Figure 2:
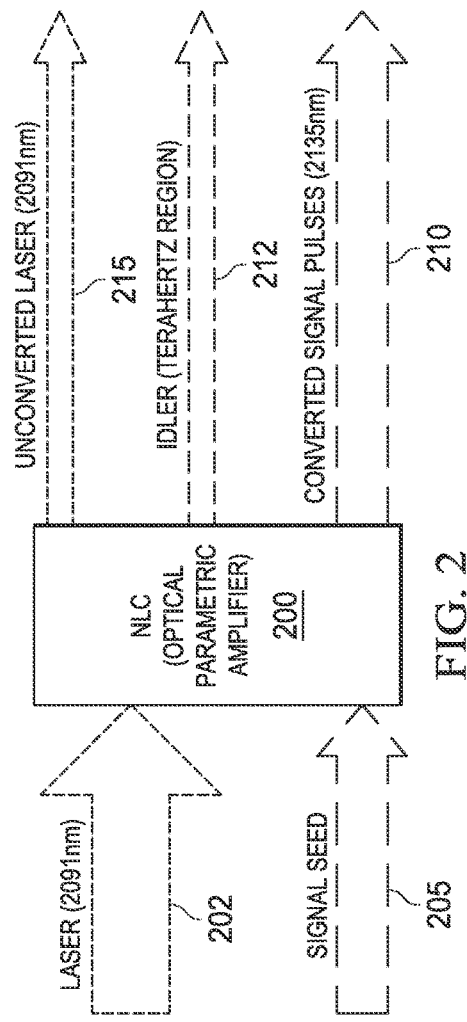
FIG. 2 illustrates an example non-linear converter (NLC) for use in a LADAR system, according to this disclosure.

FIG. 2 illustrates an example non-linear converter (NLC) for use in a LADAR system, according to this disclosure. The embodiment of the NLC 200 illustrated in FIG. 2 is for illustration only. Other embodiments could be used without departing from the scope of this disclosure. In some embodiments, the NLC 200 may represent the NLC 120 of FIG. 1.

As shown in FIG. 2, the NLC 200 receives laser pulses 202 at a particular wavelength (such as 2091 nm) and converts (or shifts) the laser pulses 202 to converted signal pulses 210 at a different wavelength (such as 2135 nm). The laser pulses 202 may represent the laser pulses 112 at the wavelength $\lambda_L$, and the converted signal pulses 210 may represent the converted pulses 122 at the wavelength $\lambda_C$, as shown in FIG. 1.

In some embodiments, the NLC 200 is an optical parametric amplifier (OPA). An optical parametric amplifier typically comprises a crystalline material and employs a three-wave mixing process in which a very strong signal at one wavelength (e.g., the laser pulses 202) amplifies low level light at the desired wavelength. Using a signal seed 205 at the desired wavelength, the OPA 200 uses an intensity dependent nonlinear optical process to convert (or shift) the laser pulses 202 at the 2091 nm wavelength to the converted signal pulses 210 at the 2135 nm wavelength. Signal gain is achieved at the high peak power of the laser pulse. Therefore, the OPA 200 does not shift the wavelength of the ASE photons in the absence of the high peak power laser pulses 202. The signal seed 205 is pulsed, with its timing synchronized to the timing of the laser input pulses 202. The signal seed 205 is turned off between laser pulses. In some embodiments, the signal seed 205 is generated using a semiconductor laser which can be rapidly turned off and on. A semiconductor laser does not store energy and therefore does not generate ASE around the signal wavelength when it is turned off (between pulses 202).

Because the OPA 200 is a photon energy conserving device, the OPA 200 also generates an idler signal 212 as a byproduct. In the embodiment described here, the frequency of the idler signal 212 is in the terahertz range. The OPA 200 also allows a small portion 215 of the laser pulses 202 to pass through unconverted.

In another embodiment, the NLC 200 may convert the laser pulse wavelength 202 using Raman shifting. A Raman shifting NLC could also comprise a crystalline material, but may comprise other materials. In Stokes shifted Stimulated Raman scattering, the frequency of the laser pulses is reduced, and the energy difference between the input pulses and the output pulses goes into the medium as heat (phonons). Thus, in a Stokes shifted Stimulated Raman scattering NLC, the photons of the idler signal 212 are replaced by phonons.

In some embodiments, it is preferable to use a wavelength shifting process in the NLC 200 that results in a minimum change in wavelength compatible with the ASE bandwidth. This minimizes the loss of energy from the laser pulse 202 due to the quantum defect associated with the conversion process. This loss of energy is manifest as the idler photons 212 in parametric conversion or phonons in a Raman shift conversion.

Although the NLC 200 is described and shown as operating using 2091 nm and 2135 nm wavelengths, it will be understood that this disclosure is not limited thereto, and other suitable laser wavelengths are possible.

Figure 3:
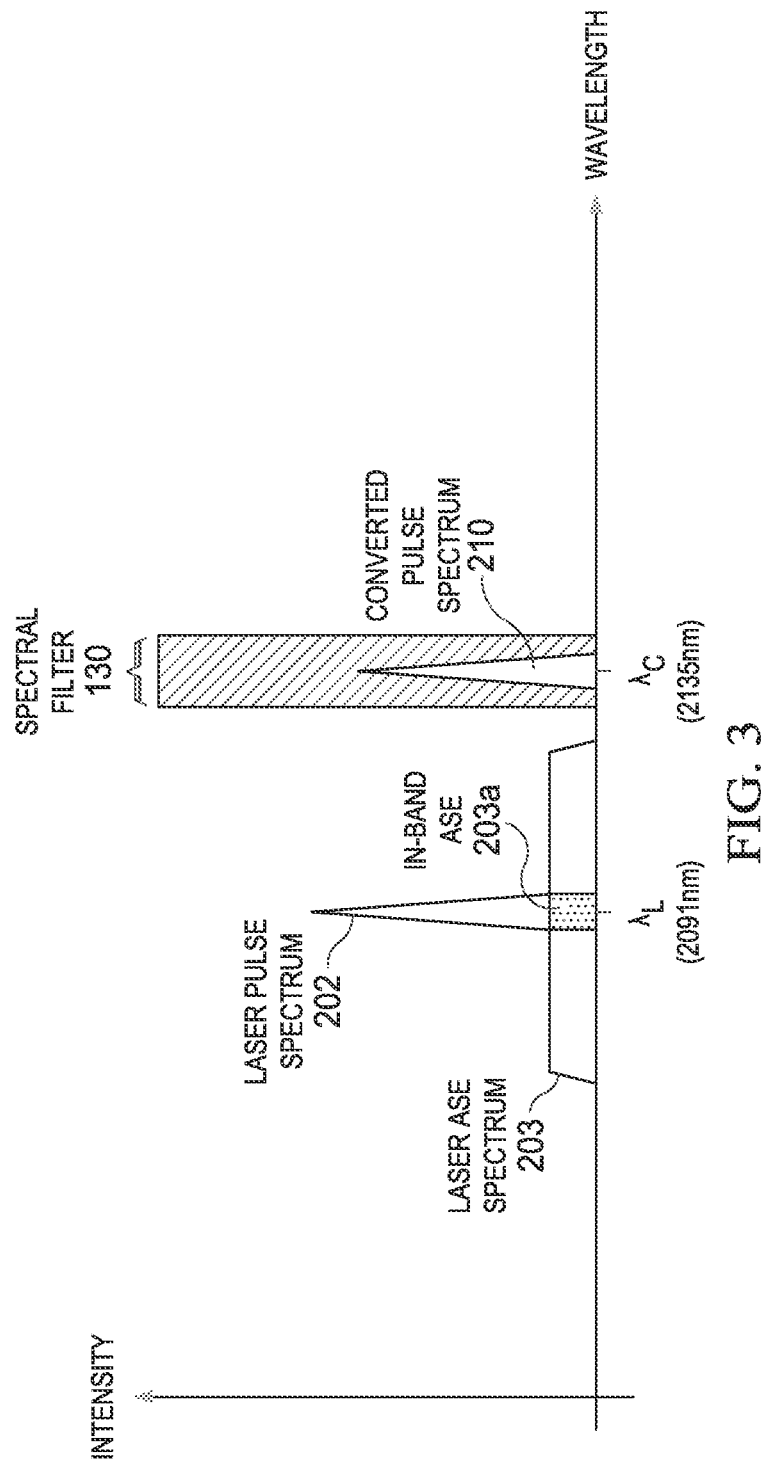
FIG. 3 illustrates a graphical representation of an example operation of the NLC of FIG. 2, according to this disclosure.

FIG. 3 illustrates a graphical representation of an example operation of the NLC 200 of FIG. 2, according to this disclosure. The embodiment of the operation illustrated in FIG. 3 is for illustration only. Other embodiments could be used without departing from the scope of this disclosure.

As shown in FIG. 3, the laser signal input to the NLC 200 includes the laser pulses 202 and the laser ASE 203. The laser pulses 202 and the laser ASE 203 are concentrated in a spectral region around the laser wavelength $\lambda_L$ (e.g., 2091 nm). However, the laser ASE 203 can be spread across the whole gain spectrum of the laser amplifier. The portion of the laser ASE spectrum 203 that is in-band with the laser pulses 202 is indicated by reference numeral 203a.

In operation, the NLC 200 shifts the wavelength $\lambda_L$ of the input laser pulses 202 to a converted wavelength $\lambda_C$ (e.g., 2135 nm). As described above, the wavelength shift generated by the NLC 200 is preferably large enough such that the wavelength $\lambda_C$ of the converted laser pulses 210 is substantially or completely outside of the ASE spectrum 203. A spectral filter (e.g., the spectral filter 130) filters out the laser ASE 203 and allows the converted laser pulses 210 to pass, thereby significantly improving the pulse contrast.

The conversion process of the NLC 200 may result in a small loss of pulse intensity. However, the trade-off between pulse power loss and the benefit of isolating the desired laser pulses from the undesired ASE is acceptable.

Figure 4:
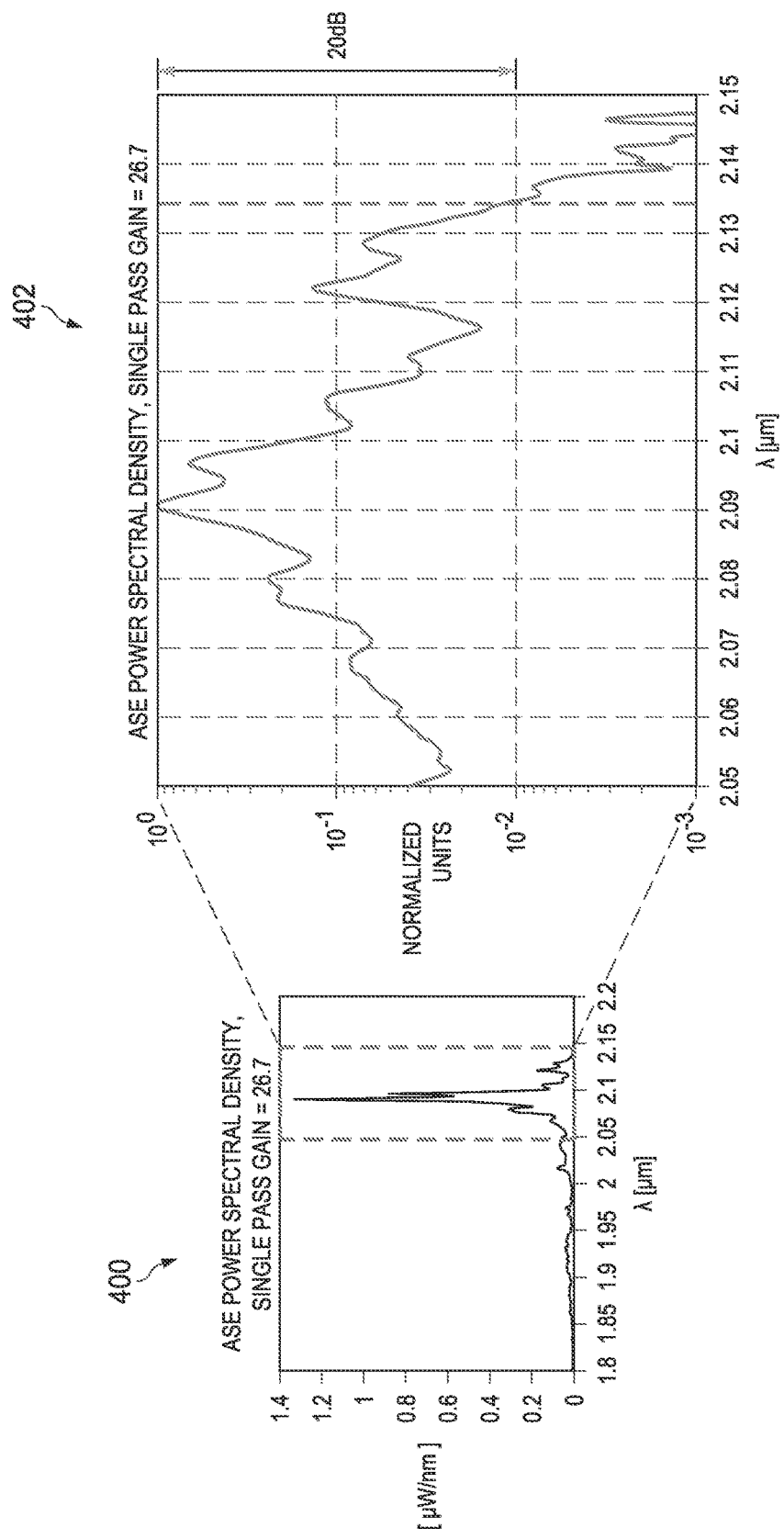
FIG. 4 illustrates a graphical representation of an ASE (amplified spontaneous emission) power spectral density of a laser amplifier for use in an example LADAR system, according to this disclosure.

FIG. 4 illustrates a graphical representation of an ASE power spectral density of a laser amplifier for use in an example LADAR system, according to this disclosure. The embodiment illustrated in FIG. 4 is for illustration only. Other embodiments could be used without departing from the scope of this disclosure.

As shown in FIG. 4, a chart 400 illustrates the ASE power spectral density (PSD) of a single-pass Ho:YAG laser amplifier. Such an amplifier may be used in a laser transmitter in a LADAR system (e.g., the laser transmitter 110 in the LADAR system 100). The spectrum of the laser ASE includes wavelengths from approximately 1800 nm to approximately 2150 nm, with a peak gain at 2091 nm.

A chart 402 shows an enlarged view of a portion of the chart 400 indicated by the box. As shown in the enlarged chart 402, the power spectral density of the ASE at 2135 nm is approximately one one-hundredth of the power spectral density of the ASE at the 2091 nm peak. Stated another way, the power spectral density of the ASE at 2135 nm is at least 20 dB less than the power spectral density at 2091 nm. Thus, if a non-linear converter (e.g., the NLC 200) shifts the wavelength of the laser pulses from 2091 nm to 2135 nm, the in-band ASE at the converted wavelength (2135 nm) is reduced by 20 dB or more as compared to the in-band ASE at the laser wavelength (2091 nm). This is a significant reduction for a relatively modest wavelength shift.

Figure 5:
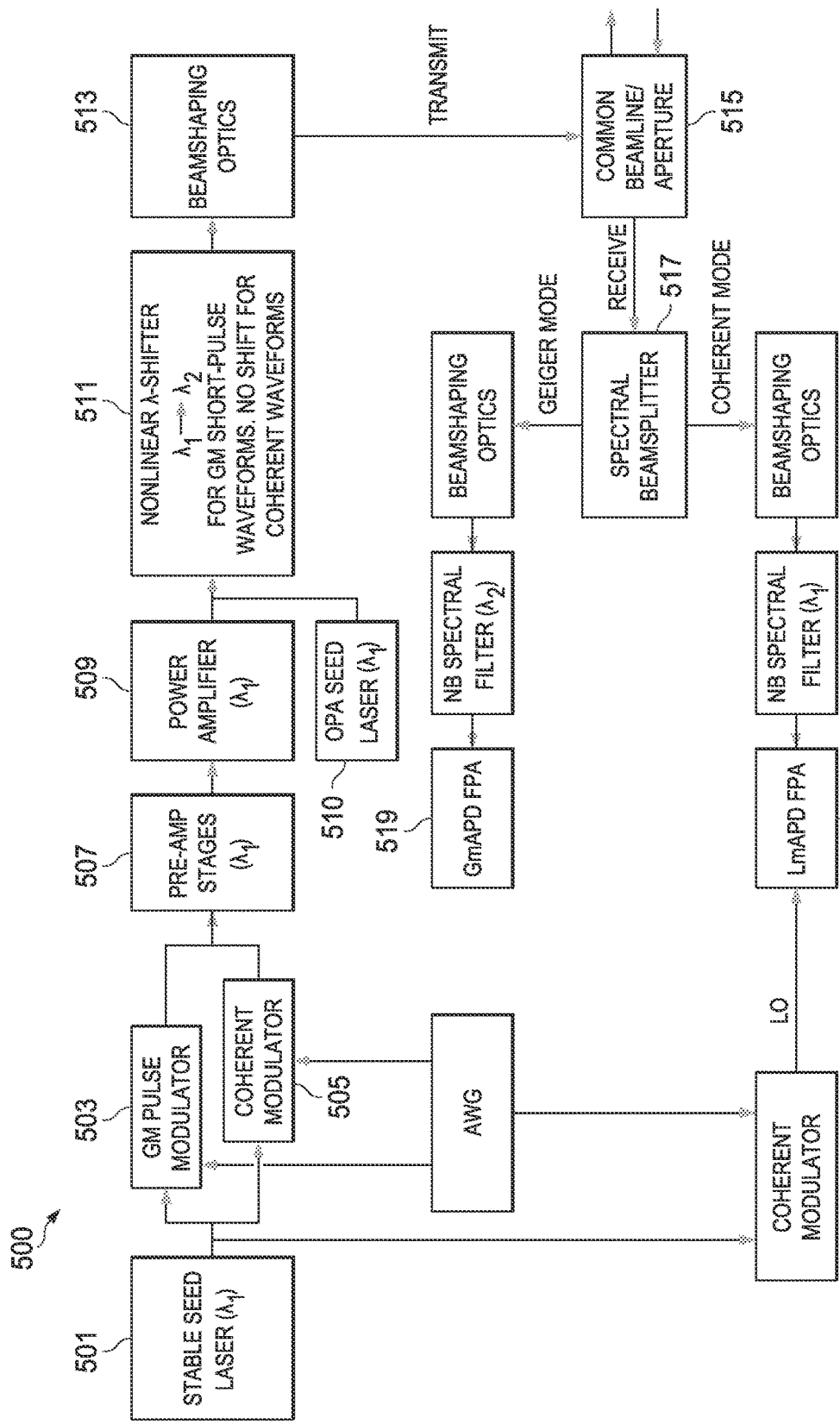
FIG. 5 illustrates an example dual Geiger mode and coherent mode LADAR system, according to this disclosure.

FIG. 5 illustrates an example dual Geiger mode and coherent mode LADAR system, according to this disclosure. In a dual mode LADAR system, two sensors are pointed at the same target and some means of directing the return to the proper sensor is needed. The dual mode LADAR system 500 provides such a means. The embodiment of the LADAR system 500 illustrated in FIG. 5 is for illustration only. Other embodiments could be used without departing from the scope of this disclosure. In some embodiments, the LADAR system 500 may represent or include the LADAR transmit path 100 shown in FIG. 1.

In the system 500, coherent and Geiger mode transmit beams are generated at the same wavelength. The system 500 can shift the wavelength of the high-intensity pulses of the Geiger mode transmit beam, but leave the low-intensity coherent-mode wavelength unchanged. The Geiger mode and coherent mode return signals can then be spectrally distinguished at the LADAR receiver. This is particularly useful if separate detector arrays are employed for Geiger and coherent modes of operation. In that case, the received light can be directed to either the Geiger mode or coherent mode arrays via a dichroic beamsplitter, as described below.

As shown in FIG. 5, a stable seed laser 501 generates a laser output. Depending on the mode of operation, the output from the stable seed laser 501 is processed by a Geiger mode pulse modulator (i.e., an intensity modulator) 503 to generate short Geiger mode pulses, or is transmitted to a coherent modulator (i.e., a phase modulator) 505, which chirps the frequency of the laser output. The laser output is then received at one or more pre-amp stages 507, which are typically fiber amplifiers, and then transmitted to a power amplifier 509, which amplifies the pulsed laser output produced in Geiger mode operation, or the chirped CW laser output produced in coherent mode operation, depending on which mode of operation is selected.

The amplified light from the power amplifier then enters the nonlinear converter (or wavelength shifter) 511. In some embodiments, the NLC 511 may be the same as or similar to the NLC 120 of FIG. 1 or the NLC 200 of FIG. 2. In the NLC 511, the high peak intensity pulses for Geiger mode operation are shifted in wavelength, such as described with respect to FIG. 2. However, the low intensity continuous wave (CW) laser output produced in the coherent mode of operation and the low intensity ASE produced in the Geiger mode of operation are not converted or shifted in the NLC 511, and remain at the same wavelength. In an OPA implementation of the NLC 511, the NLC 511 receives input from a seed diode 510, which is turned off between pulses. The seed diode 510 provides the seed input at the shifted wavelength, such as described in FIG. 2.

The light from the NLC 511 passes through beam shaping optics 513 and an aperture 515, where it is then directed to the target. Once the light echoes off the target, it is received again at the aperture 515 and transmitted to a spectral beamsplitter 517 in the receive path. The spectral beamsplitter 517 is a dichroic beamsplitter configured to receive laser signals from both modes of operation (i.e., Geiger mode and coherent mode). Based on the wavelength of the received laser signals, the spectral beamsplitter 517 directs the received laser signals along a Geiger mode receive path to a Geiger mode sensor, or along a coherent mode path to a coherent sensor. For example, the spectral beamsplitter 517 may reflect the spectrum where the coherent laser operates, and transmit the spectrum where the Geiger mode laser operates.

For example, if the received laser signals comprise wavelength shifted Geiger mode pulses, the beamsplitter 517 passes the laser signals along the Geiger mode receive path to a Geiger mode avalanche photodiode (APD) focal plane array (FPA) 519. Alternatively, if the received laser signals comprise CW laser output or ASE scattered back from optics, the beam splitter 517 passes the laser signals along the coherent mode receive path to a linear mode APD and FPA 521. The linear mode APD FPA 521 performance is not degraded by ASE.

Thus, wavelength shifting of laser pulses in the NLC 511 enables passive switching of the return signal between coherent and Geiger mode sensors using spectral separation at the beamsplitter 517. Therefore, no programming or hardware is required to actively switch between the FPAs in the receive path.

Although FIGS. 1 through 5 illustrate example embodiments of this disclosure, various changes may be made to FIGS. 1 through 5. For example, the various components shown in each of FIGS. 1 through 5 may be incorporated in other figures without departing from the scope of this disclosure. Further, the makeup and arrangement of the various components is for illustration only. Components could be added, omitted, combined, arranged in a different location or order, or placed in any other configuration according to particular needs.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

Various functions described herein can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A laser radar (LADAR) system, the LADAR system comprising:
    a laser transmitter configured to emit laser pulses at a first wavelength;
    a non-linear converter configured to convert the laser pulses to a second wavelength prior to spectral filtering of amplified spontaneous emission (ASE) that is emitted from the laser transmitter in a spectrum concentrated around the first wavelength; and
    a spectral filter configured to substantially filter the ASE and allow the laser pulses at the second wavelength to pass.

2. The LADAR system of claim 1, wherein the second wavelength is outside of at least a substantial portion of the ASE spectrum.

3. The LADAR system of claim 1, wherein the non-linear converter employs an intensity-dependent conversion process that converts the laser pulses to the second wavelength but does not substantially affect the ASE.

4. The LADAR system of claim 1, wherein the non-linear converter comprises an optical parametric amplifier configured to receive a signal seed at the second wavelength and convert the laser pulses to the second wavelength by amplifying the signal seed.

5. The LADAR system of claim 1, wherein the non-linear converter comprises a Raman shifting wavelength converter.

6. The LADAR system of claim 1, wherein the laser transmitter comprises a Geiger mode laser transmitter.

7. The LADAR system of claim 1, wherein the laser transmitter comprises one of a Nd:YAG (Neodymium-doped yttrium aluminum garnet (YAG)) amplifier, a Yb:YAG (Ytterbium-doped YAG) amplifier, a Tm:YAG (Thulium-doped YAG) amplifier, a Ho:YAG (Holmium-doped YAG) amplifier, an Er:YAG (Erbium YAG) amplifier, an Er:glass amplifier, or an Er,Yb:glass amplifier.

8. The LADAR system of claim 1, wherein the LADAR system is a dual Geiger mode and coherent mode LADAR system, the LADAR system further comprising:
    a Geiger mode pulse modulator configured to generate Geiger mode laser pulses;
    a coherent modulator configured to generate a coherent LADAR waveform laser signal at the first wavelength; and
    a passive beamsplitter in a receive path of the LADAR system, the passive beamsplitter configured to separate the laser pulses at the second wavelength from a continuous wave laser signal at the second wavelength.

9. A method for use in a laser radar (LADAR) system, the method comprising:
    emitting, at a laser transmitter, laser pulses at a first wavelength and amplified spontaneous emission (ASE) in a spectrum concentrated around the first wavelength;
    converting, at a non-linear converter, the laser pulses to a second wavelength prior to spectral filtering of the ASE; and
    substantially filtering, at a spectral filter, the ASE and allowing the laser pulses at the second wavelength to pass.

10. The method of claim 9, wherein the second wavelength is outside of at least a substantial portion of the ASE spectrum.

11. The method of claim 9, wherein the wavelength conversion comprises an intensity-dependent conversion process that converts the laser pulses to the second wavelength but does not substantially affect the ASE.

12. The method of claim 9, wherein the non-linear converter comprises an optical parametric amplifier, and wherein converting the laser pulses further comprises:
    receiving, at the optical parametric amplifier, a signal seed at the second wavelength and converting the laser pulses to the second wavelength by amplifying the signal seed.

13. The method of claim 9, wherein the non-linear converter comprises a Raman shifting wavelength converter.

14. The method of claim 9, wherein the laser transmitter comprises a Geiger mode laser transmitter.

15. The method of claim 9, wherein the laser transmitter comprises one of a Nd:YAG (Neodymium-doped yttrium aluminum garnet (YAG)) amplifier, a Yb:YAG (Ytterbium-doped YAG) amplifier, a Tm:YAG (Thulium-doped YAG) amplifier, a Ho:YAG (Holmium-doped YAG) amplifier, an Er:YAG (Erbium YAG) amplifier, an Er:glass amplifier, or an Er,Yb:glass amplifier.

16. The method of claim 9, wherein the LADAR system is a dual Geiger mode and coherent mode LADAR system, the method further comprising:
    generating, at a Geiger mode pulse modulator, Geiger mode laser pulses;
    generating, at a coherent modulator, a coherent LADAR waveform laser signal at the first wavelength; and
    separating, at a passive beamsplitter, the laser pulses at the second wavelength from a continuous wave laser signal at the second wavelength.

17. A Geiger mode laser radar (LADAR) system, the Geiger mode LADAR system comprising:
    a Geiger mode laser transmitter configured to emit laser pulses at a first wavelength;
    a non-linear converter configured to convert the laser pulses to a second wavelength prior to spectral filtering of amplified spontaneous emission (ASE) that is emitted from the laser transmitter in a spectrum concentrated around the first wavelength; and
    a spectral filter disposed in a transmit path of the Geiger mode LADAR system, the spectral filter configured to substantially filter the ASE and allow the laser pulses at the second wavelength to pass.

18. The Geiger mode LADAR system of claim 17, wherein the second wavelength is outside of at least a substantial portion of the ASE spectrum.

19. The Geiger mode LADAR system of claim 17, wherein the non-linear converter employs an intensity-dependent conversion process that converts the laser pulses to the second wavelength but does not substantially affect the ASE.

20. The Geiger mode LADAR system of claim 17, further comprising:
    a second spectral filter disposed in a receive path of the Geiger mode LADAR system, the second spectral filter configured to filter at least some of the ASE and allow the laser pulses at the second wavelength to pass.

* * * * *